United States Patent Office 3,371,102
Patented Feb. 27, 1968

3,371,102
ACIDIC LIPID ANHYDRIDES
James Bruce Martin, Hamilton, Ohio, assignor to The Procter & Gamble Company, Cincinnati, Ohio, a corporation of Ohio
No Drawing. Filed Nov. 4, 1963, Ser. No. 321,331
13 Claims. (Cl. 260—347.4)

This invention relates to new organic compounds and, more particularly, to new edible acidic lipid anhydrides having utility as additives for bakery products such as bread, cakes, pies, doughnuts, icings, fillings, and the like products prepared from emulsions comprising water, fat, protein and/or carbohydrates.

The volume, texture, and eating qualities of many bakery products are dependent upon the interaction of various ingredients during the mixing operation in which a dough, batter, or other emulsion is formed and the stabilization during subsequent baking and/or storage of said bakery product. Many attempts have been made to improve the emulsion characteristics of bakery products by incorporating therein small amounts of various edible additives which are able to affect the colloidal properties of the proteinaceous, amylaceous, or oleaginous constituents. Although a number of the conventional additives such as lecithin and the partial glycerides of higher fatty acids have been found to be useful emulsifiers in bakery products, these emulsifiers have not provided the desired foam stability in association with the air incorporation produced during preparation of doughs, batters, and other bakery emulsions.

It is, therefore, a primary object of this invention to provide a new group of edible organic compounds which provide superior foam stability in association with the air incorporation produced during preparation of doughs, batters, and other bakery emulsions.

The above and related objects are effectuated by a group of new compounds having the general formula $$\begin{array}{c} X\quad Y\quad X\quad Z \\ \diagdown\,/\ \ \diagdown\,/ \\ HC\quad\quad HC \\ |\quad\quad\ \ | \\ C\quad\quad\ \ C \\ /\!/\ \ \diagdown\ \ \diagdown\!/\!/ \\ O\quad O\quad O \end{array}$$

wherein X is selected from the group consisting of
$$-H,\ -CH_3,\ \text{and}\ -O\overset{O}{\overset{\|}{C}}CH_3$$

Y is a radical selected from the group consisting of:

(1) $-(R')_a CH_2 O\overset{O}{\overset{\|}{C}} R$ (2) $-(R')_a \overset{O}{\overset{\|}{C}} O CH_2 R$ (3) $-(R')_a \overset{O}{\overset{\|}{C}} O (R'')_b O \overset{O}{\overset{\|}{C}} R$ (4) $-(R')_a \overset{O}{\overset{\|}{C}} O C_r H_{2r-1}(CH_3) O \overset{O}{\overset{\|}{C}} R$ (5) $-(R')_a \overset{O}{\overset{\|}{C}} O C_3 H_5 (O\overset{O}{\overset{\|}{C}} R)_2$ (6) $-(R')_a \overset{O}{\overset{\|}{C}} O C_3 H_5 (O\overset{O}{\overset{\|}{C}} R) O \overset{O}{\overset{\|}{C}} CH_2 R' \overset{O}{\overset{\|}{C}} (O\overset{O}{\overset{\|}{C}} R''')_c W$ (7) $-(R')_a \overset{O}{\overset{\|}{C}} O CH(CH_3) \overset{O}{\overset{\|}{C}} O C_3 H_5 (O\overset{O}{\overset{\|}{C}} R)_d W_f$ (8) $-(R')_a \overset{O}{\overset{\|}{C}} O C_3 H_5 (O\overset{O}{\overset{\|}{C}} R) O \overset{O}{\overset{\|}{C}} CH_3$ (9) 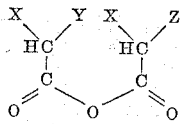

(10) 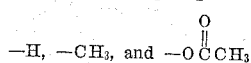

$R=$a radical selected from the group consisting of
$-C_n H_{2n+1}$ and $-C_n H_{2n-1}$ $R'=$a radical selected from the group consisting of
$-CH_2-, -C_2H_4-, -C_3H_6-,$ and $-OCH_2-$ $R''=$a radical selected from the group consisting of
$-CH_2-$ and a 2,2'-disubstituted diethyl ether group $R'''=-CH_2(R')_a \overset{O}{\overset{\|}{C}} OC_3H_5(O\overset{O}{\overset{\|}{C}} R) O\overset{O}{\overset{\|}{C}} CH_2R' \overset{O}{\overset{\|}{C}}-$ $W=$a radical selected from the group consisting of
$-OH$ and $-O\overset{O}{\overset{\|}{C}} CH_3$ $Z=$a member selected from the group consisting of $-H$ and Y
$a=$zero to 1
$b=1$ to 6
$c=$zero to 10
$d=1$ to 2
$e=$zero to 2
$f=$zero to 1
$n=11$ to 21
$r=2$ to 4, and provided that When $R''=$a 2,2'-disubstituted diethyl ether radical, $b=1$
When $R''=-CH_2-$, $b=2$ to 6
When $Y=$radicals (1) through (9), $X=-H$
When $Y=$radical (10), $X=CH_3$ The following specific example illustrates the new organic compounds of this invention, but the invention is not limited to this specific example.

*Example A*

Included within the class of compounds having the above general formula are the non-cyclic anhydrides of acidic lipids selected from the group consisting of (a) the condensation product of fatty acid containing from about 12 to about 22 carbon atoms with an ω-hydroxy-monocarboxylic acid having from 3 to 6 carbon atoms, in which case $Y=$radical (1);

(b) the condensation product of a dicarboxylic acid having no hydroxy groups and containing from 3 to 6 carbon atoms with a straight chain fatty alcohol having from about 12 to about 22 carbon atoms, in which case $Y=$radical (2);

(c) the condensation product of a dicarboxylic acid having no hydroxy groups and containing from 3 to 6 carbon atoms with a straight chain aliphatic α-ω diol monoester of fatty acid, said diol containing from 3 to 5 carbon atoms and said fatty acid having from about 12 to about 22 carbon atoms, in which case $Y=$radical (3);

(d) the condensation product of a dicarboxylic acid having no hydroxy groups and containing from 3 to 6 carbon atoms with a straight chain aliphatic primary-secondary diol monoester of fatty acid, said diol containing from 3 to 5 carbon atoms and said fatty acid having from about 12 to about 22 carbon atoms, in which case $Y=$radical (4);

(e) the condensation product of a dicarboxylic acid having no hydroxy groups and containing from 3 to 6 carbon atoms with a partial fatty acid glyceride

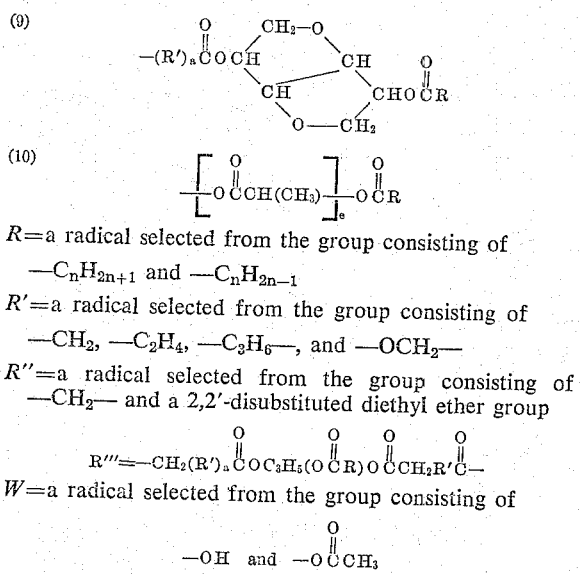

containing an average of 2 fatty acid radicals having from about 12 to about 22 carbon atoms, in which case $Y$=radical (5);

(f) the condensation product of a dicarboxylic acid having no hydroxy groups and containing from 3 to 6 carbon atoms with a partial fatty acid glyceride containing an average of 1 fatty acid radical having from about 12 to about 22 carbon atoms, in which case $Y$=radical (6);

(g) the condensation product of a monohydroxy-monocarboxylic acid containing 3 carbon atoms with a dicarboxylic acid having no hydroxy groups and containing from 3 to 6 carbon atoms and with a partial fatty acid glyceride containing an average of from 1 to 2 fatty acid radicals having from about 12 to about 22 carbon atoms, in which case $Y$=radical (7);

(h) the condensation product of a dicarboxylic acid having no hydroxy groups and containing from 3 to 6 carbon atoms with a partial fatty acid glyceride containing an average of at least 1 fatty acid radical having from about 12 to about 22 carbon atoms and an average of at least 1 fatty acid radical having from about 2 to 6 carbon atoms, in which case $Y$=radical (8);

(i) the condensation product of a dicarboxylic acid having no hydroxy groups and containing from 3 to 6 carbon atoms with a hexitan monoester of fatty acid having from about 12 to about 22 carbon atoms, in which case $Y$=radical (9);

(j) the condensation product of a polymeric monohydroxy-monocarboxylic acid containing 3 carbon atoms with a fatty acid having from about 12 to about 22 carbon atoms, said polymeric acid having an average of from about 1 to about 3 lactyl groups per molecule, in which case $Y$=radical (10);

said condensation products (a) through (j) having at least one free carboxyl group per molecule.

All of the preceding-named acidic lipids have at least one free carboxyl group per molecule available for reaction with another similar or dissimilar acidic lipid to form an acidic lipid anhydride. Specific examples of the above acidic lipids which can be used to form the acidic lipid anhydrides of this invention, and their methods of preparation, are set forth hereinbelow for purposes of illustration.

*Example B*

The acidic lipids used in forming the acidic lipid anhydrides of this invention must contain at least one "long-chain" or "higher" fatty acid radical having from 12 to 22 carbon atoms. A particularly desirable fatty acid is stearic acid. Examples of other suitable fatty acids are lauric, myristic, palmitic, oleic, linoleic, linolenic, arachidic, behenic, and erucic acids. These so-called "long-chain" fatty acids can be readily obtained from naturally-occurring glycerides by saponification, acidulation, and isolation procedures. The fatty acid desired determines the choice of glyceridic material. For example, a technical grade of stearic acid can be obtained from highly hydrogenated soybean oil and a technical grade of behenic acid can be obtained from a highly hydrogenated rapeseed oil. Stearic acid is the preferred fatty acid which was used in the preparation of the acidic lipid anhydrides of this invention.

*Example C*

(a) Among the ω-hydroxy-monocarboxylic acids which can be used to form suitable condensation products with the above-mentioned "long-chain" fatty acids are 3-hydroxypropanoic acid, 4-hydroxybutanoic acid, 5-hydroxypentanoic acid and 6-hydroxyhexanoic acid. The fatty acid derivatives of these ω-hydroxy-monocarboxylic acids can be prepared by acylation with fatty acid chlorides such as described in U.S. Patent 2,251,695, granted to Tucker, Aug. 5, 1941. By another useful method, monoacyl derivatives of ω-hydroxy-monocarboxylic acids can be prepared by the oxidation of monoacyl diol esters having primary hydroxyl groups. Sodium permanganate in acetic acid is an effective oxidizing system.

(b) Examples of condensation products of dicarboxylic acids and fatty alcohols which can be used to form acidic lipid anhydrides of this invention are the condensation products of malonic, succinic, glutaric, adipic, methyl succinic and dimethyl succinic acid with straight chain fatty alcohols such as myristyl, cetyl, stearyl, arachidyl, and behenyl alcohols. These condensation products can be prepared by esterifying the dicarboxylic acid with the fatty alcohol, such esterification being advantageously carried out in a mutual solvent such as dimethylformamide, dimethylacetamide, dioxane, xylene, and toluene, either with or without the use of a catalyst such as sulfuric acid, p-toluene sulfonic acid, hydrogen chloride, zinc chloride, and other such catalysts. The preparations are best carried out in the range of from about 75° C. to about 175° C. with water being removed by evolution under reduced pressure or by azeotropic distillation. The desired condensation products are isolated by appropriate distillation, and/or washing, and/or crystallization treatments when required to remove solvents, excess reactants, and impurities. When available, cyclic anhydrides of the above dicarboxylic acids can be reacted with an equal molar quantity of the fatty alcohol with or without a mutual solvent such as xylene at temperatures in the range of from about 100° C. to 160° C. as an alternative method of preparation of the acidic lipid. Succinic and glutaric condensates of the fatty alcohol are the preferred acidic lipids of this type which were used to form the acidic lipid anhydrides of this invention.

(c) and (d) Specific condensation products of dicarboxylic acids and diol monoesters which can be used in the practice of this invention are the reaction products of the above-mentioned dicarboxylic acids or dicarboxylic acid anhydrides with monoesters of (c) 1,3-propanediol, 1,4-butanediol, 1,5-pentanediol and (d) propylene glycol. The condensation reactions can be carried out by the same procedures used to prepare the condensation products in (b), using the appropriate diol monoester in place of fatty alcohol. Succinic and glutaric condensates of propylene glycol are the preferred acidic lipids of these types which were used to form the acidic lipid anhydrides of this invention.

(e) and (f) Included within the class of condensation products of dicarboxylic acids and partial fatty acid glycerides which can be used to form novel acidic lipid anhydrides of this invention are the reaction products of the above-mentioned dicarboxylic acids or dicarboxylic acid anhydrides with (e) diglycerides, (f) monoglycerides, and mixtures of mono- and diglycerides containing fatty acid radicals of the preceding-named "long-chain" fatty acids, such as stearic acid. Appropriate condensation reactions for the preparation of these partial glyceride esters can also be carried out by the same procedure used to prepare the condensation products in (b), using the appropriate partial glycerides in place of fatty alcohol. Succinic and glutaric condensates of the mono- and diglycerides are the preferred acidic lipids of these types which were used to form the acidic lipid anhydrides of this invention.

(g) Lactic and sarcolactic acids can be reacted with the above-mentioned dicarboxylic acid and partial fatty acid glycerides to form suitable condensation products which are useful for preparing novel acidic lipid anhydrides of this invention. For example, lactic acid and mono- and/or diglycerides can be interesterified under partial vacuum and elevated temperatures of approximately 300° F. to form a lactic acid ester. The lactic acid ester can also be prepared by reacting glycerine, fatty acid, and lactic acid as described in U.S. Patent 2,690,971, granted to Iveson et al., Oct. 5, 1954. The above-formed lactic acid ester can then be esterified with a dicarboxylic acid such as succinic acid under appropriate conditions such as described for the condensation reactions in (b).

(h) Condensation products in this group are similar to the condensation products of groups (e) and (f) except that the partial glyceride contains an average of at least one "short-chain" or lower fatty acid radical, such as acetyl, in addition to an average of at least one "long-chain" fatty acid radical of the type described in (e) and (f). Products marketed under the trade-mark "Myvacet" are suitable examples of such acetylated glycerides. The condensation reactions of these acetylated glycerides with dicarboxylic acids can be carried out by the same procedure described in (e) and (f).

(i) The above-mentioned dicarboxylic acids can also be condensed with hexitan monoesters of fatty acids such as sorbitan monostearate marketed under the trade-mark "Span 60," and similar hexitan esters such as mannitan monopalmitate. Suitable condensation reactions of the hexitan esters with the dicarboxylic acids can be carried out according to procedures described in (b).

(j) Polymeric monohydroxy-monocarboxylic acid esters which can be used to form acidic lipid anhydrides of this invention can be prepared by reacting lactic acid and sarcolactic acid with higher fatty acids such as stearic acid. A suitable method for the preparation of these polymeric esters is described in U.S. Patent 2,789,992, granted to Thompson et al., Apr. 23, 1957.

The most effective methods for the formation of the new acidic lipid anhydrides of this invention employ metathesis of the above-mentioned intermediate acidic lipids with acetic anhydride at low temperatures, i.e., 0° to 60° C. with perchloric acid catalysis, or at higher temperatures, i.e., 60° to 150° C. without catalysis with perchloric acid, but with volatilization of the acetic acid formed in the reaction.

Although specific methods of preparing the aforesaid acidic lipid anhydrides are described herein, it is not intended that the invention should be limited to a particular method of preparation of these compounds.

The acidic lipid anhydrides of this invention have been found to markedly enhance cake volume, texture, and grain and materially improve batter stabilization. The most beneficial and dramatic effect of the acidic lipid anhydrides is their ability to stabilize foams during baking and the consequent formation of very good cake texture and grain, such use being described in the copending application of Martin and Howard, U.S. Serial No. 247,860, filed Dec. 28, 1962, now U.S. Patent 3,168,405. Although many of the acidic lipids from which the anhydrides can be derived are capable of facilitating the incorporation of air in cake batters, they do not have the characteristic stabilizing properties of the acidic lipid anhydrides. The acidic lipids also tend to form a coarse open-grained texture in contradistinction to the very fine grain produced by the anhydride. Because of these deficiencies of the acidic lipids, their optimum use in batter systems generally depends upon the addition of other materials which are usually unnecessary in the case of the acidic lipid anhydrides of this invention.

Although it is not desired to be bound by theory, it is believed that the non-ionic nature of the acidic lipid anhydrides, as distinguished from the ionic nature of the acidic lipids, enables the formation of a covalent bond with batter ingredients, such as protein, which leads to the effective stabilization of the batter. The acidic lipid anhydrides of this invention do not ionize in batter systems as do the acidic lipids.

Again, though it is not desired to be bound by theory, it is believed that the solid state crystal structure of the acidic lipid anhydrides may have an important bearing on their functionality in batter systems in a unique manner not manifested by the acidic lipids.

The following examples further illustrate the new organic compounds of this invention and their methods of preparation but the invention is not limited to these specific examples.

Example 1

Forty-four grams (0.1 mole) of stearoyl propylene glycol hydrogen succinate was mixed with 30 grams (0.3 mole) of acetic anhydride and heated at reflux for one hour. The mixture was then heated at 120° C. to 130° C. for 2 hours with reduction of pressure to a final range of 2 to 5 mm. Hg. The residue was cooled, with recovery of 41.5 grams (96% yield) of stearoyl propylene glycol succinate anhydride.

The anhydride product was found by analysis to have the following characteristics:

| | |
|---|---|
| Complete melting point, ° C. | 77.7 |
| Minimum melting point, ° C. | 41.0 |
| Saponification value (S.V.) | 385 |
| Percent carbon | 69.4 |
| Percent hydrogen | 10.4 |

The calculated analytical values were: S.V.=388; percent C=69.40; percent H=10.41.

Example 2

Twenty grams (0.1 mole) of octadecyl hydrogen glutarate and 20 grams (0.2 mole) of acetic anhydride were heated together at 120° C. to 130° C. for 1 hour. The volatiles were removed from the reaction product by distillation at 120° C. for 1 hour with reduction of pressure to a final range of 2 mm. Hg. The residue was dissolved in 500 ml. hexane and the solution was crystallized at 70° F. The crystals were separated by filtration and vacuum dried at room temperature, with a yield of 18.3 grams octadecyl glutarate anhydride.

The anhydride product was found by analysis to have the following characteristics:

| | |
|---|---|
| Complete melting point, ° C. | 75.8 |
| Minimum melting point, ° C. | 75.8 |
| Saponification value (S.V.) | 291 |
| Percent carbon | 73.2 |
| Percent hydrogen | 11.6 |

The calculated analytical values were: S.V.=299; percent C=73.6; percent H=11.5.

Example 3

Eighteen grams (0.1 mole) of stearoyl-4-hydroxy-butyric acid and 18 grams (0.18 mole) of acetic anhydride were mixed together and heated at 120° C. for one hour. The reaction mixture was then held at a temperature of 120° C. for 2 hours with reduction of the pressure to a final range of 2 to 5 mm. Hg to remove the volatile acetic acid formed and the excess acetic anhydride. The residue was dissolved in 500 ml. hexane and the solution was crystallized at 80° F. The crystals were separated by filtration and vacuum dried at room temperature, with a yield of 16 grams of stearoyl-4-hydroxybutyric anhydride.

The anhydride product was found by analysis to have the following characteristics:

| | |
|---|---|
| Complete melting point, ° C. | 79.9 |
| Minimum melting point, ° C. | 75.8 |
| Saponification value (S.V.) | 311 |
| Percent carbon | 72.9 |
| Percent hydrogen | 10.9 |

The calculated analytical values were: S.V.=311; percent C=73.1; percent H=11.4.

Example 4

One hundred grams (ca. 0.3 mole) of a commercial stearoyl polylactic acid having an average of about 2 lactyl groups per molecule (sold under the name stearoyl-2-lactylic acid) and 100 grams (1 mole of acetic anhydride were heated at 120° C. for one hour. The volatiles were removed from the reaction product by distillation at 120° C. to 130° C. for one hour with reduction of pressure to a final value of 2 mm. Hg. A yield of 93 grams of anhydride product was obtained. The anhydride structure of the stearoyl-2-lactylic anhydride product was demonstrated by a comparison of analytical values of the anhydride and its precursor acid as follows:

| Material | Saponification Value | Acid Value | Infrared Absorption at 5.5 microns |
|---|---|---|---|
| Stearoyl-2-lactylic acid | 312 | 192 | None. |
| Stearoyl-2-lactylic anhydride | 328 | *115 | Strong. |

* Not a true acid value, but an apparent acid value since the compound has no free carboxyl group. The existing anhydride group reacts reasonably rapidly with the base added in the determination of acid value to form 1 mole of salt (soap) and 1 mole of ethyl ester. This process is not exactly stoichiometric since some water is present in the solution which leads to acid as a product instead of ethyl ester. This acid component leads to a somewhat high apparent acid value.

*Example 5*

One hundred grams monostearoyl sorbitan hydrogen glutarate ("Span 60" hydrogen glutarate prepared by condensing glutaric acid with a commercial sorbitan monostearate sold under the trade-mark "Span 60") and 80 grams acetic anhydride were heated together at 120° C. to 130° C. for one hour. The reaction mixture was then held at a temperature of 130° C. for 1 hour with a reduction of pressure to a final range of 2 to 5 mm. Hg. A viscous anhydride product (52.7 grams) was recovered from the reaction vessel. The anhydride structure of the "Span 60" glutarate anhydride product was demonstrated by a comparison of analytical values of the anhydride, the "Span 60", and the intermediate "Span 60" hydrogen glutarate as follows:

| Material | Hydroxyl Value | Acid Value | Saponification Value | Infrared Absorption at 5.5 microns |
|---|---|---|---|---|
| "Span 60" | 246 | 11 | 151 | |
| "Span 60" hydrogen glutarate | 1 | 135 | 372 | None. |
| "Span 60" glutarate anhydride | | *8.9 | 402 | Strong. |

* Not a true acid value, but an apparent acid value. See note in Example 4, above.

*Example 6*

Distearin hydrogen succinate, 145 grams (0.2 mole), and acetic anhydride, 200 ml. (2 moles), were mixed and heated at reflux temperature (120° C. to 130° C.) for one hour. The sample was then held under a 2 to 5 mm. pressure for one hour; then the residue was crystallized from 7 volumes of hexane at 70° F. (21° C.). The presence of a small concentration of acetic anhydride was evidenced by analysis. The sample was then heated at 125° C. for 2 hours under 0.2 mm. pressure with a yield of 139 grams distearin succinate anhydride having the following characteristics:

Complete melting point, ° C. _____ 74.8
Minimum melting point, ° C. _____ 54.0
Saponification value (S.V.) _____ 314
Percent carbon _____ 71.8
Percent hydrogen _____ 11.0

The calculated analytical values were: S.V.=313; percent C=72.2; percent H=11.1.

*Example 7*

Monostearin dihydrogen succinate, 1 mole, and acetic anhydride, 3 moles, were mixed and heated at reflux temperature (120° C. to 130° C.) for 1 hour. The volatiles were removed from the reaction product by distillation at 100° to 130° C. for 1 hour with reduction of pressure to a final range of 1 to 2 mm. Hg. The residue was crystallized from hexane with a 95% yield of monostearin disuccinate anhydride.

The anhydride product was found by analysis to have the following characteristics:

Complete melting point, ° C. _____ 49.3
Minimum melting point, ° C. _____ 41.9
Saponification value (S.V.) _____ 495
Percent carbon _____ 62.3
Percent hydrogen _____ 9.0

The calculated analytical values were: S.V.=519; percent C=64.5; percent H=8.9.

The anhydride structures of the compounds prepared in the above Examples 1 to 7 was confirmed by infrared spectral analysis.

What is claimed is:
1. A compound of the formula

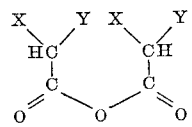

wherein X is a member selected from the group consisting of —H, —$CH_3$; Y is a radical selected from the group consisting of:

(1) $-(R')_a CH_2 O \overset{O}{\underset{\|}{C}} R$ (2) $-(R')_a \overset{O}{\underset{\|}{C}} OCH_2 R$ (3) $-(R')_a \overset{O}{\underset{\|}{C}} O(R'')_b O \overset{O}{\underset{\|}{C}} R$ (4) $-(R')_a \overset{O}{\underset{\|}{C}} O C_r H_{2r-1}(CH_3) O \overset{O}{\underset{\|}{C}} R$ (5) $-(R')_a \overset{O}{\underset{\|}{C}} O C_3 H_5 (O \overset{O}{\underset{\|}{C}} R)_2$ (6) $-(R')_a \overset{O}{\underset{\|}{C}} O C_3 H_5 (O \overset{O}{\underset{\|}{C}} R) O \overset{O}{\underset{\|}{C}} CH_2 R' \overset{O}{\underset{\|}{C}} OH$ (7) $-(R')_a \overset{O}{\underset{\|}{C}} O CH(CH_3) \overset{O}{\underset{\|}{C}} O C_3 H_5 (O \overset{O}{\underset{\|}{C}} R)_d$ (8) $-(R')_a \overset{O}{\underset{\|}{C}} O C_3 H_5 (O \overset{O}{\underset{\|}{C}} R) O \overset{O}{\underset{\|}{C}} CH_3$ (9) $-(R')_a \overset{O}{\underset{\|}{C}} O CH \begin{array}{c} CH_2-O \\ \diagdown \\ CH \\ \diagup \\ O-CH_2 \end{array} CH O \overset{O}{\underset{\|}{C}} R$

(10) $\left[ -O \overset{O}{\underset{\|}{C}} CH(CH_3) \right]_e -O \overset{O}{\underset{\|}{C}} R$ R=a radical selected from the group consisting of —$C_nH_{2n+1}$ and —$C_nH_{2n-1}$
R'=a radical selected from the group consisting of $CH_2$, —$C_2H_4$—, —$C_3H_6$—
R''=a radical selected from the group consisting of —$CH_2$— and —$CH_2CH_2OCH_2CH_2$—
a=zero to 1
b=1 to 6
d=1 to 2
e=zero to 2
n=11 to 21
r=2 to 4, and provided that When R''=—$CH_2CH_2OCH_2CH_2$—, b=1
When R''=—$CH_2$, b=2 to 6
When Y=radicals (1) through (9), X=—H
When Y=radical (10), X=$CH_3$ 2. Propylene glycol monoester of fatty acid succinate anhydride wherein the fatty acid contains from 12 to 22 carbon atoms.

3. Propylene glycol monoester of fatty acid glutarate anhydride wherein the fatty acid contains from 12 to 22 carbon atoms.

4. Stearoyl propylene glycol succinate anhydride.

5. Fatty alcohol succinate anhydride wherein the fatty alcohol contains from 11 to 21 carbon atoms.

6. Fatty alcohol glutarate anhydride wherein the fatty alcohol contains from 11 to 21 carbon atoms.

7. Octadecyl glutarate anhydride.

8. A member selected from the group consisting of a mono- or diglyceride of fatty acid succinate anhydride wherein the fatty acid contains from 12 to 22 carbon atoms.

9. A member selected from the group consisting of a mono- or diglyceride of fatty acid glutarate anhydride wherein the fatty acid contains from 12 to 22 carbon atoms.

10. Distearin succinate anhydride.

11. Monostearin disuccinate anhydride.

12. Stearoyl polylactic anhydride.

13. Monostearoyl sorbitan glutarate anhydride.

References Cited
UNITED STATES PATENTS

| | | | |
|---|---|---|---|
| 3,168,405 | 2/1965 | Martin et al. | 99—91 |
| 2,552,706 | 5/1951 | Bertram | 99—123 |
| 3,033,686 | 5/1962 | Landfried et al. | 260—410 |

HENRY R JILES, *Primary Examiner.*

R. BOYD, *Assistant Examiner.*